United States Patent [19]

Cabrit et al.

[11] Patent Number: 4,497,510

[45] Date of Patent: Feb. 5, 1985

[54] CONNECTION-DISCONNECTION DEVICE BETWEEN ONE RIGID PIPE, INSIDE WELL-TUBING CONNECTED TO A BASE BY AN ARTICULATED COUPLING, AND ANOTHER RIGID PIPE FIXED TO THIS BASE

[75] Inventors: Philippe Cabrit, Pau; Jean Mourlevat, Roquefort S/Garonne; Jacques de Saint-Palais, Pau, all of France

[73] Assignee: Societe Nationale Elf Aquitaine (Production), France

[21] Appl. No.: 518,442

[22] Filed: Jul. 29, 1983

Related U.S. Application Data

[63] Continuation of Ser. No. 096,840, Nov. 23, 1980, abandoned.

[51] Int. Cl.³ .............................................. F16L 35/00
[52] U.S. Cl. ...................................... 285/18; 285/315; 285/320
[58] Field of Search .......... 285/18, DIG. 7, DIG. 21, 285/315, 320, 24, 27; 29/450, 452; 166/212, 359, 367

[56] References Cited

U.S. PATENT DOCUMENTS

| | | | |
|---|---|---|---|
| 3,325,190 | 6/1967 | Eckert et al. | 285/320 X |
| 3,492,027 | 1/1970 | Herring | 285/320 X |
| 3,510,153 | 5/1970 | Newton | 285/18 |
| 3,521,909 | 7/1970 | Brown | 285/3 |
| 3,545,543 | 12/1970 | Kammerer | 166/212 |
| 4,058,137 | 11/1977 | Palais et al. | 137/236 S |
| 4,087,119 | 5/1978 | Capdebosc | 285/18 |
| 4,146,082 | 3/1979 | Granger | 285/18 |
| 4,258,792 | 3/1981 | Restarick | 285/18 |

Primary Examiner—Dave W. Arola
Attorney, Agent, or Firm—Poms, Smith, Lande & Rose

[57] ABSTRACT

This invention concerns the connection and disconnection of well-pipes in an articulated structure level with the articulation.

The device comprises a length of flexible pipe, at one end of which is an adapter containing a sealing device, a positioning device and a locking device, and at the other end of which is another adapter containing a sealing device and a locking device, these sealing, positioning and locking devices being designed to fit into upper and lower receptacles, the upper receptacle consisting of the lower end of the tubing pipe, and the lower receptacle consisting of the upper end of the seabed pipe, the whole connection-disconnection device being able to pass through the upper receptacle.

This connection-disconnection device is specially designed for use in articulated hydrocarbon-production installations.

11 Claims, 9 Drawing Figures

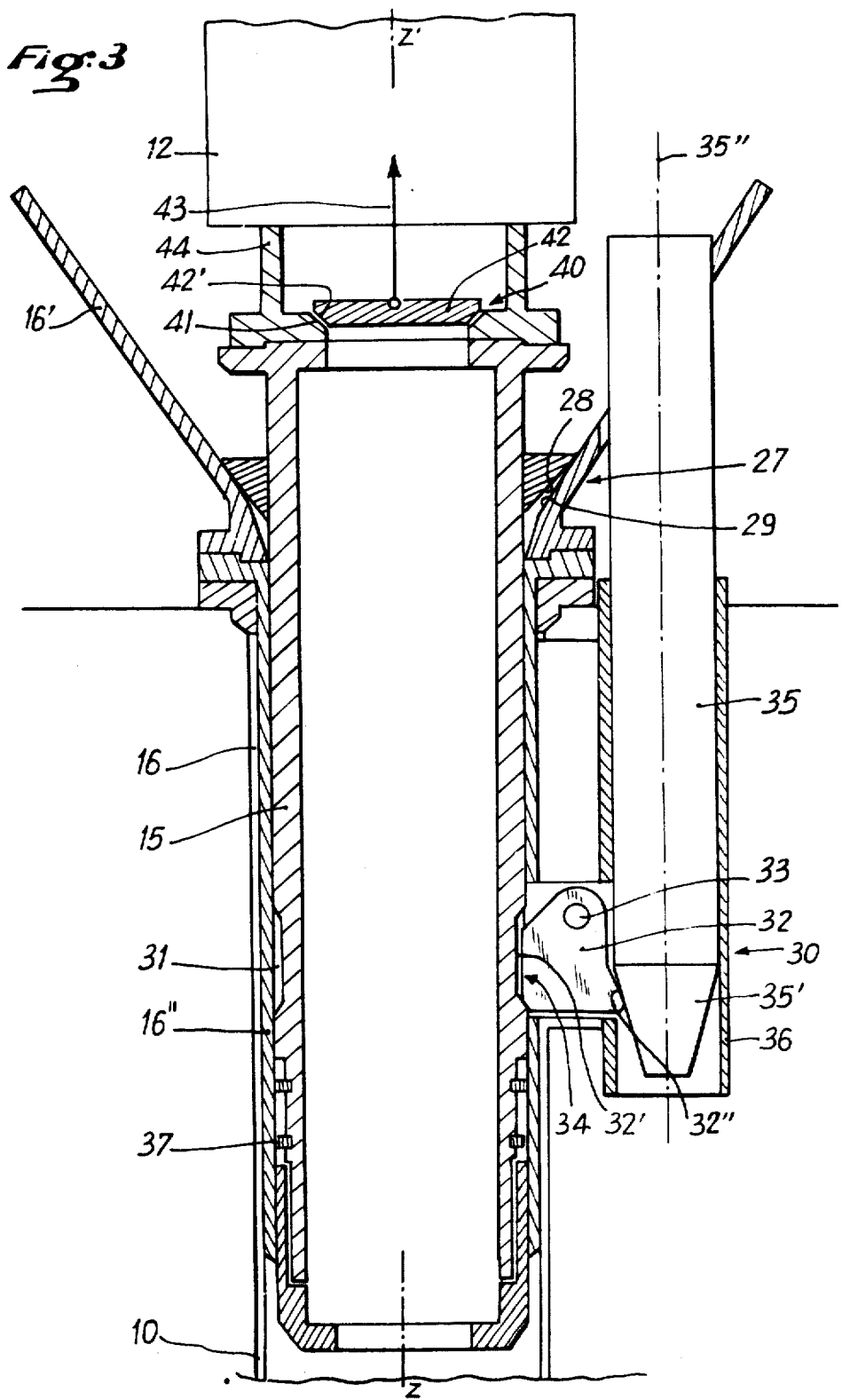

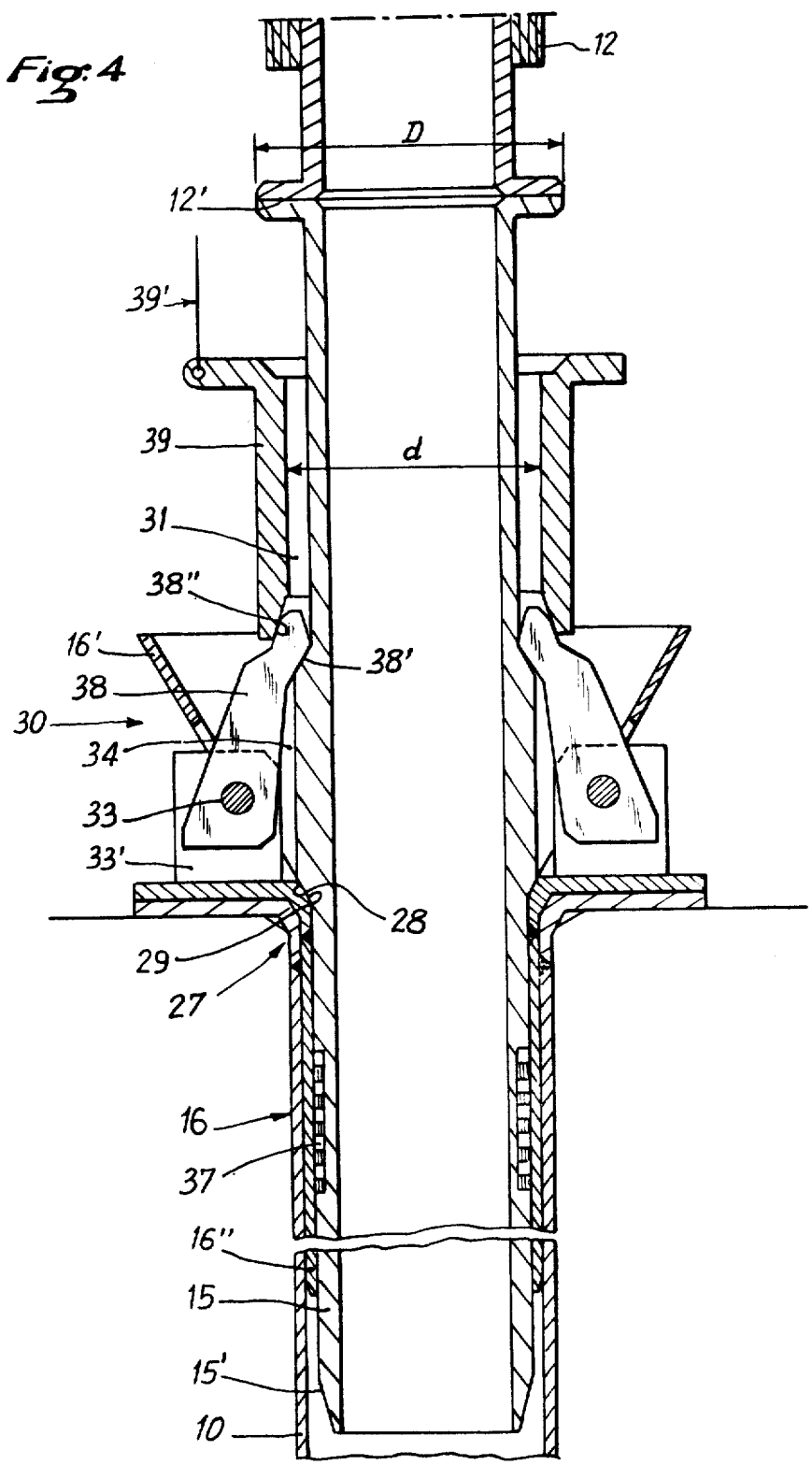

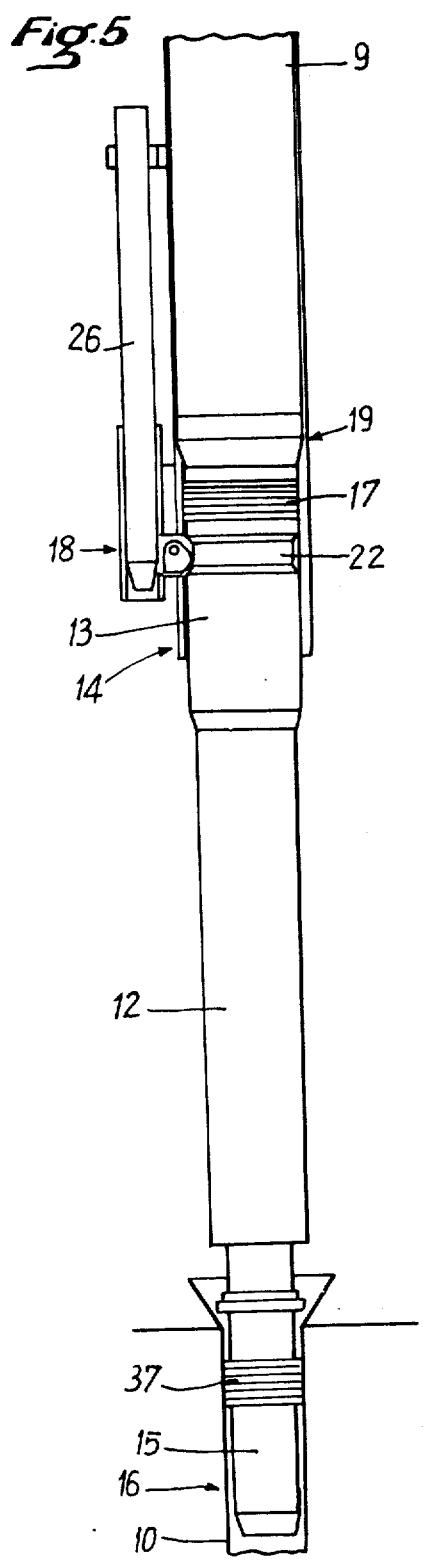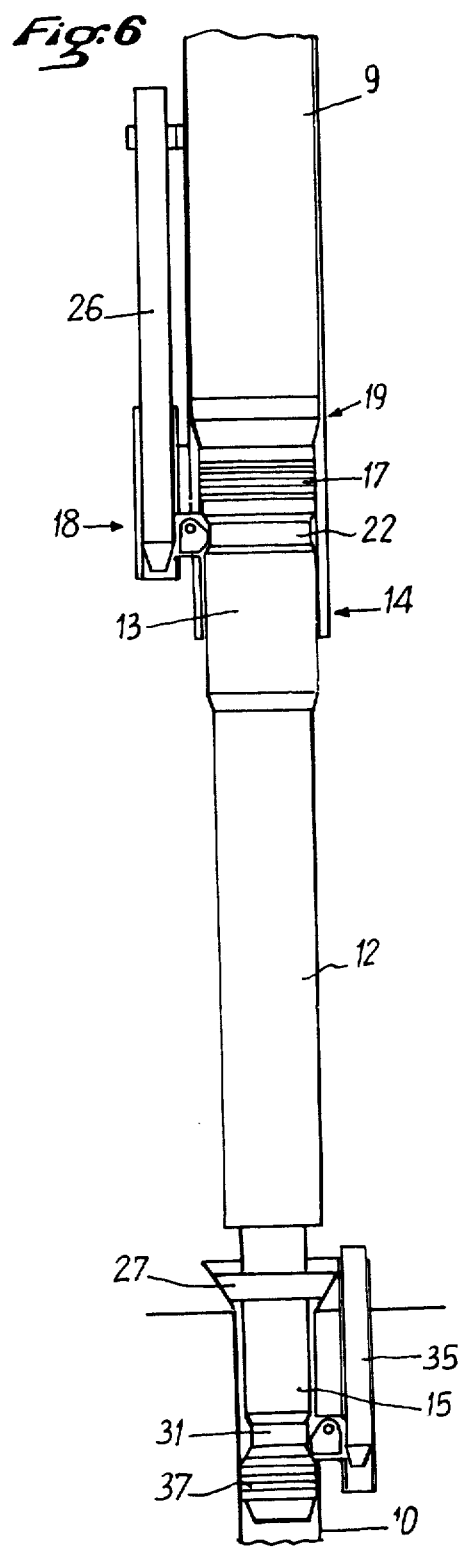

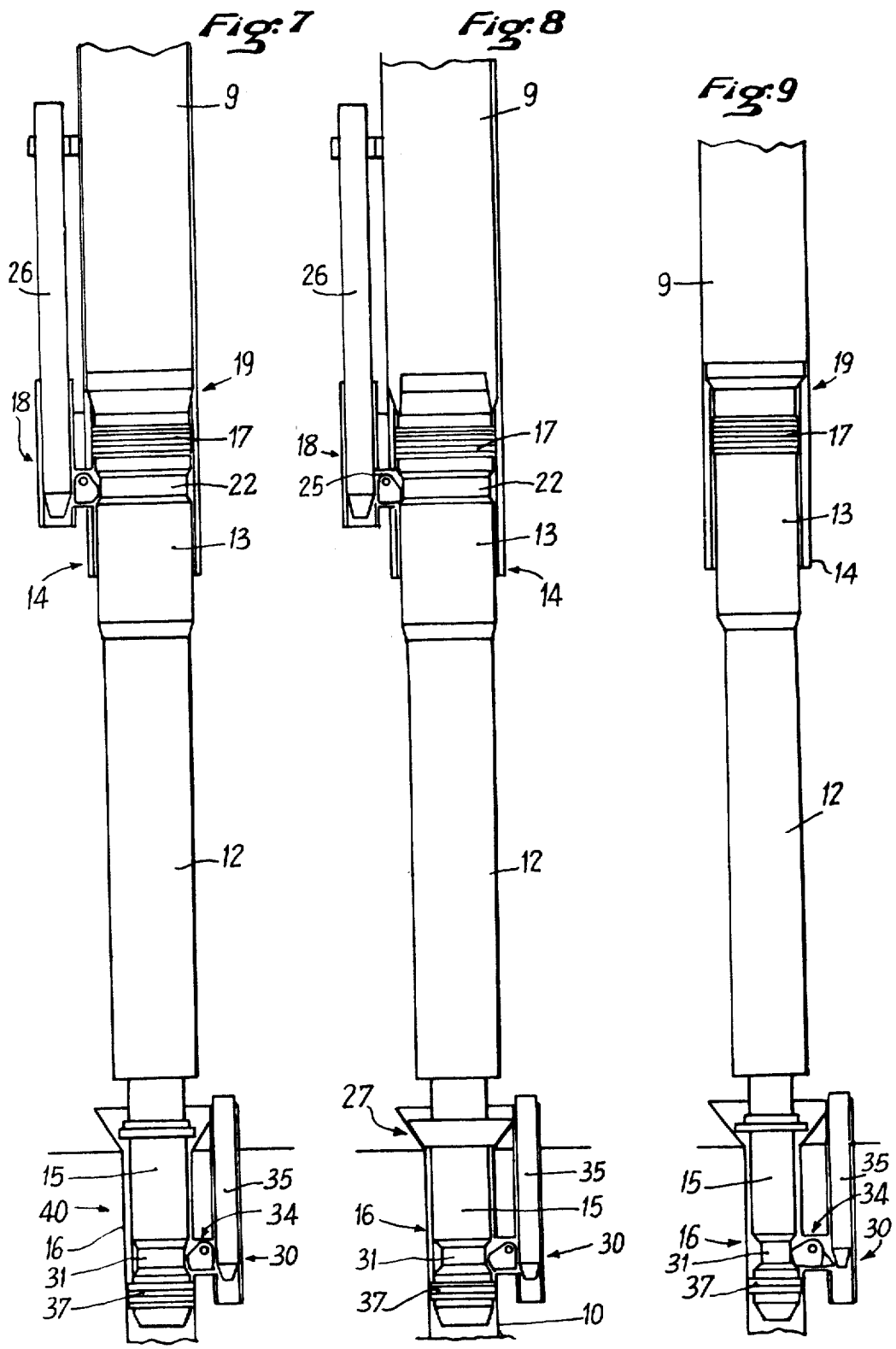

CONNECTION-DISCONNECTION DEVICE BETWEEN ONE RIGID PIPE, INSIDE WELL-TUBING CONNECTED TO A BASE BY AN ARTICULATED COUPLING, AND ANOTHER RIGID PIPE FIXED TO THIS BASE

This application is a continuation of application Ser. No. 096,840, filed Nov. 23, 1980, and now abandoned.

BACKGROUND OF THE INVENTION

This invention concerns a device for connecting and disconnecting pipes in an articulated structure level with the articulation.

Use of such articulated structures, particularly in the form of articulated tubing for underwater hydrocarbon-production operations, raises the problem of connecting the pipes inside such tubings to pipes fixed to the seabed, flexibly enough to adapt to oscillatory movements of the tubing caused by movements in the water in which it is installed.

In French patent application No. 75 11505 of Apr. 14, 1975, the applicant described a device comprising a production pipe which could move freely inside a guide-well, which itself is fixed to an articulated tubing, this production pipe containing a lower component connected on the one hand to a base pipe by means of a connection-disconnection device remote-controlled from the surface, and on the other hand to the following production pipe component by a coupling, forming a piston which can only slide lengthwise inside a cylindrical seating consisting of the lower portion of the guide-well.

In such a device, bending forces level with the articulated joint of the tubing are distributed along the lower component, which can be removed and replaced from the surface.

Such a solution is perfectly suitable for connecting pipes of small cross-sectional areas, such as pipes less than 200 mm in diameter, and particularly in an off-centre position. This is because these couplings, if they are constructed with rigid pipes, cannot respond satisfactorily to stress variations resulting from the off-centre position. However, portions of flexible pipe, consisting of concentric layers of elastic materials such a neoprene, with inserted reinforcements, possibly of metal, can be used at the tubing base in fairly axial positions to the tubing.

This invention describes a method of installing and removing these flexible pipe components for maintenance, by providing them with connection-disconnection devices at both ends.

These connection-disconnection devices, basically mechanical in nature, are used to instal or remove the flexible pipe by lowering or raising it through the pipe inside the articulated tubing, from the rig surface above the water.

In this process for connecting and disconnecting one rigid tubular pipe, referred as the tubing pipe, inside tubing connected to a base by an articulated coupling, and another rigid tubular pipe, fixed to this base and referred to as the base pipe, a flexible component to connect the tubing pipe and base pipe is lowered through the tubing pipe, at least one end of this connecting component is positioned, and each end of the component is locked in turn into the corresponding ends of the tubing pipe and base pipe, a watertight seal being provided at each end.

In this process, the length of the flexible connecting pipe between its adapter ends is less than the distance between the corresponding components at the ends of the tubing and base pipes, and one end, which contains a positioning device, is locked in position, the flexible connecting pipe is stretched, by being either pulled or pressurized, and the other end is locked in position.

In another process for connecting and disconnecting one rigid tubular pipe, referred to as the tubing pipe, inside tubing connected to a base by an articulated coupling, and another rigid tubular pipe, fixed to this base and referred to as the base pipe, a flexible component to connect the tubing pipe and base is lowered through the tubing pipe, the length of this flexible connecting pipe between a positioning device at the top and a locking device at the bottom being less than the distance between the corresponding components at the ends of the tubing and base pipes, and the upper end of the flexible connecting pipe is positioned inside the lower end of the tubing pipe, the flexible pipe is stretched by pressurizing it, and finally the lower end is locked in position inside the base pipe.

The connection-disconnection device used in this process between a rigid tubular pipe, referred to as the tubing pipe, inside tubing connected to a base by an articulated coupling, and another rigid tubular pipe fixed to this base, and referred to as the base pipe, comprises a flexible pipe with at one end an adapter containing a sealing device and a locking device, and at the other end another adapter containing a sealing device, one of these two adapters also containing a positioning device, these sealing, positioning and locking devices being designed to fit inside an upper receptacle consisting of the lower end of the tubing pipe and a lower receptacle consisting of the upper end of the base pipe, the minimum inside cross-sectional area of the upper receptacle being greater than the largest outside circumference of the flexible pipe and adapter below the positioning device on the adapter inside the upper receptacle, and the sealing device on the first adapter being positioned on the other side of the locking device from the flexible pipe.

When the second adapter contains a positioning device designed to fit into the upper receptacle, connection to the lower receptacle is obtained by pressurizing the space inside the flexible pipe.

In one embodiment, the first adapter contains a positioning device, designed to fit inside the upper receptacle.

In another embodiment, the second adapter also contains a locking device and a positioning device, the sealing devices on each adapter being located on the other side of the locking device from the flexible pipe, and the distance between reference points on the positioning devices on upper and lower adapters being approximately equal to the distance between matching reference points on the corresponding positioning devices in the upper and lower receptacles.

In one recommended embodiment, the second adapter also contains a locking device, the sealing devices on each adapter being located on the other side of the locking device from the flexible pipe, and the distance between reference points on the locking devices on upper and lower adapters being less than the distance between matching reference points on the corresponding locking devices in the upper and lower receptacles, by an amount not exceeding one quarter of the possible elastic elongation of the flexible pipe.

When the first adapter contains a positioning device designed to fit into the upper receptacle, connection to the lower receptacle is obtained by pressurizing the space inside the flexible pipe.

When the first adapter is designed to fit into the lower receptacle connection to the lower receptacle is obtained by pulling the flexible pipe upwards.

In various embodiments, the device to position an adapter inside its receptacle comprises an annular surface tapering outwards towards the top, between an upper cylindrical section and a lower cylindrical section of the adapter, and designed to rest on a tapering annular seating surface between an upper section and a lower section of the inside surface of the receptacle, the dimensions of the upper and lower sections of the receptacle being slightly greater than the corresponding upper and lower sections of the adapter.

In various embodiments, the device to lock an adapter inside its receptacle comprises an annular slot on the outside circumference of each adapter and at least one locking component, with a remote-control system on the surface which moves it from a non-locking position through an aperture in the wall of the receptacle into a locking position, both slot and aperture being at the same distance from the positioning device.

In one recommended embodiment, the system for controlling the locking movement comprises at least one cylindrical weight which moves along a cylindrical casing, on an axis parallel to the axis of the receptacle and fixed to the side of it, the weight being connected by cable with the surface, and terminating in a tapering lower end, which rests on part of the circumference of the locking component.

In this embodiment, the locking component consists of a vertical plate which can rotate freely round an axis formed by a pivot, the ends of which are fixed to the receptacle, and the lower end of the component, facing towards the inside of the receptacle, is shaped in such a way that it can rest inside the slot on the adapter, while the part of the locking component facing outwards is shaped in such a way that, whatever position the locking component is in on its axis, the tapering lower end of the cylindrical weight will rest on at least one point of it.

In one particular embodiment, the system operated from the surface to lock a lower adapter into the lower receptacle comprises an annular weight, connected to the surface by at least one operating cable, and the inside diameter of the major cylindrical part of which is greater than the largest outside diameter of the lower adapter and less than the outside diameter of a flange connecting the flexible pipe to the lower adapter, this same major cylindrical part extending downwards in a bell-shaped tapering mouth, this annular weight sliding along the lower adapter, from an initial position of readiness beneath the upper receptacle, before the connection-disconnection device is lowered, to a second position in readiness, in contact with the flange connecting the flexible pipe with the lower adapter, to a final locking position, in which the internal tapering section rests on the outer circumference of locking components, the pivots of which are positioned further down, at a distance from the axis greater than the inside radius of the ring.

It will be easier to understand the invention from the following description of some possible embodiments among others, illustrated by the following figures:

FIG. 3 is a cross-sectional view of a lower adapter with positioning, locking and sealing devices, in its receptacle.

FIG. 4 is a cross-sectional view of a lower adapter with positioning, locking and sealing devices, with control by an annular weight.

FIG. 5 shows a device with an upper adapter with all three devices and a lower adapter with a sealing device.

FIG. 6 shows a device with upper and lower adapters each with positioning, locking and sealing devices.

FIG. 7 shows a device with an upper adapter with all three devices and a lower adapter with sealing and locking devices.

FIG. 8 shows a device with a lower adapter with all three devices and an upper adapter with sealing and locking devices.

FIG. 9 shows a device with an upper adapter with sealing and positioning devices and a lower adapter with sealing and locking devices.

Figure 1:
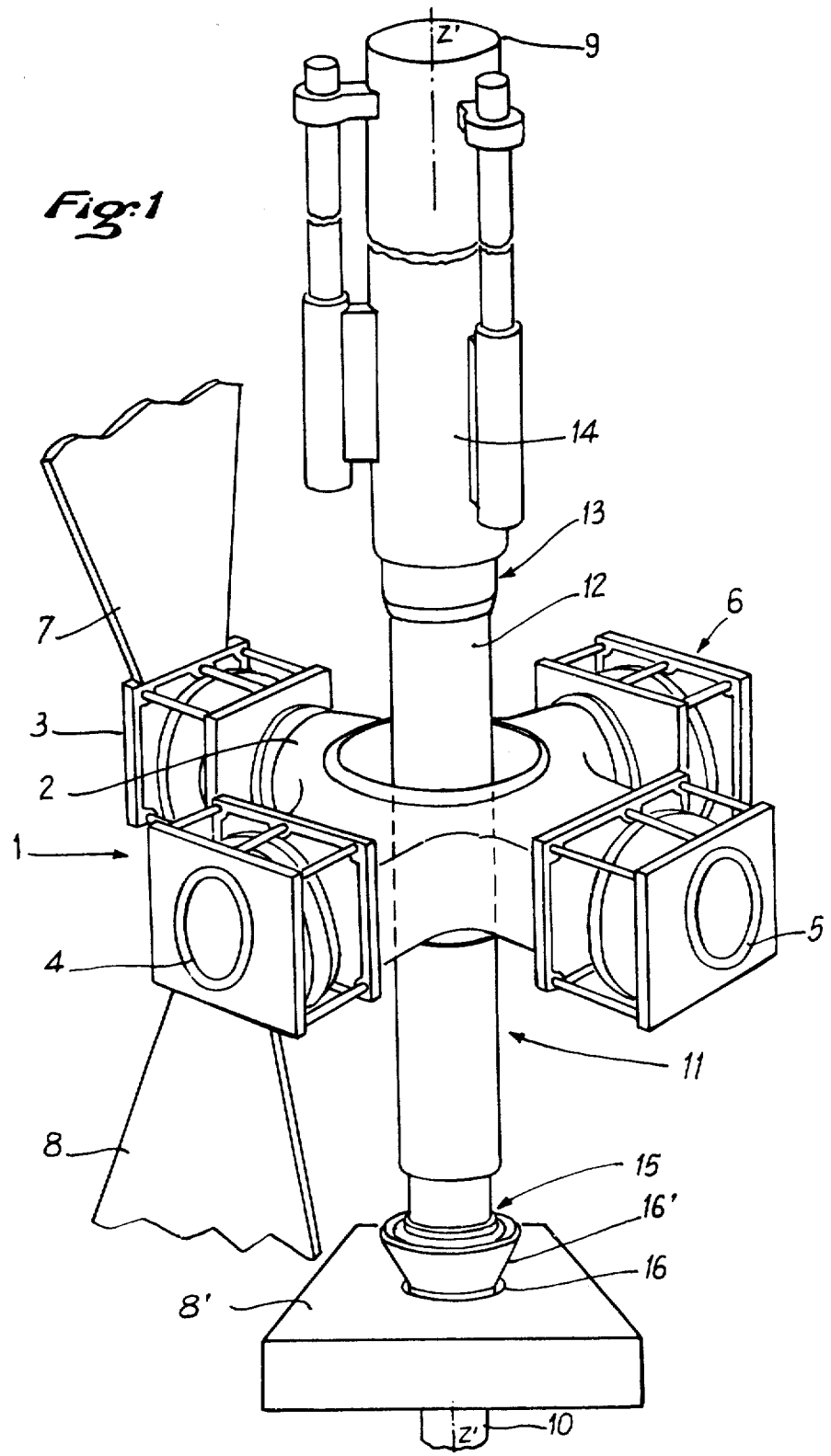
FIG. 1 shows the connection-disconnection device.

FIG. 1 gives a diagrammatical view of a device to connect and disconnect a tubing pipe with a base pipe in an articulated structure, level with the articulation.

The articulation 1 consists in this case of a universal joint comprising a ring 2 with four pivoting components 3, 4, 5 and 6, along four orthogonal radial axes. The outer ends of components 3 and 5 are connected by plates 7 to an articulated tubing (not shown here), while the outer ends of the other two components 4 and 6 are connected by plates 8 to a base 8'.

A rigid tubular pipe 9, the tubing pipe, is attached inside the articulated tubing by means not shown here. A rigid tubular pipe 10, the base pipe, is fixed to the base 8' by means not shown here.

The pipe 9 is connected to the pipe 10 by means of a connection-disconnection device 11.

This device comprises a flexible pipe component 12, at one end of which is an upper adapter 13, which fits into an upper receptacle 14 consisting of the lower end of the tubing pipe 9, and at the other end a lower adapter 15, which fits into a lower receptacle 16 consisting of the upper end of the base pipe 10. The receptacle 16 extends upwards in the form of a splayed tapering component 16'.

Figure 2:
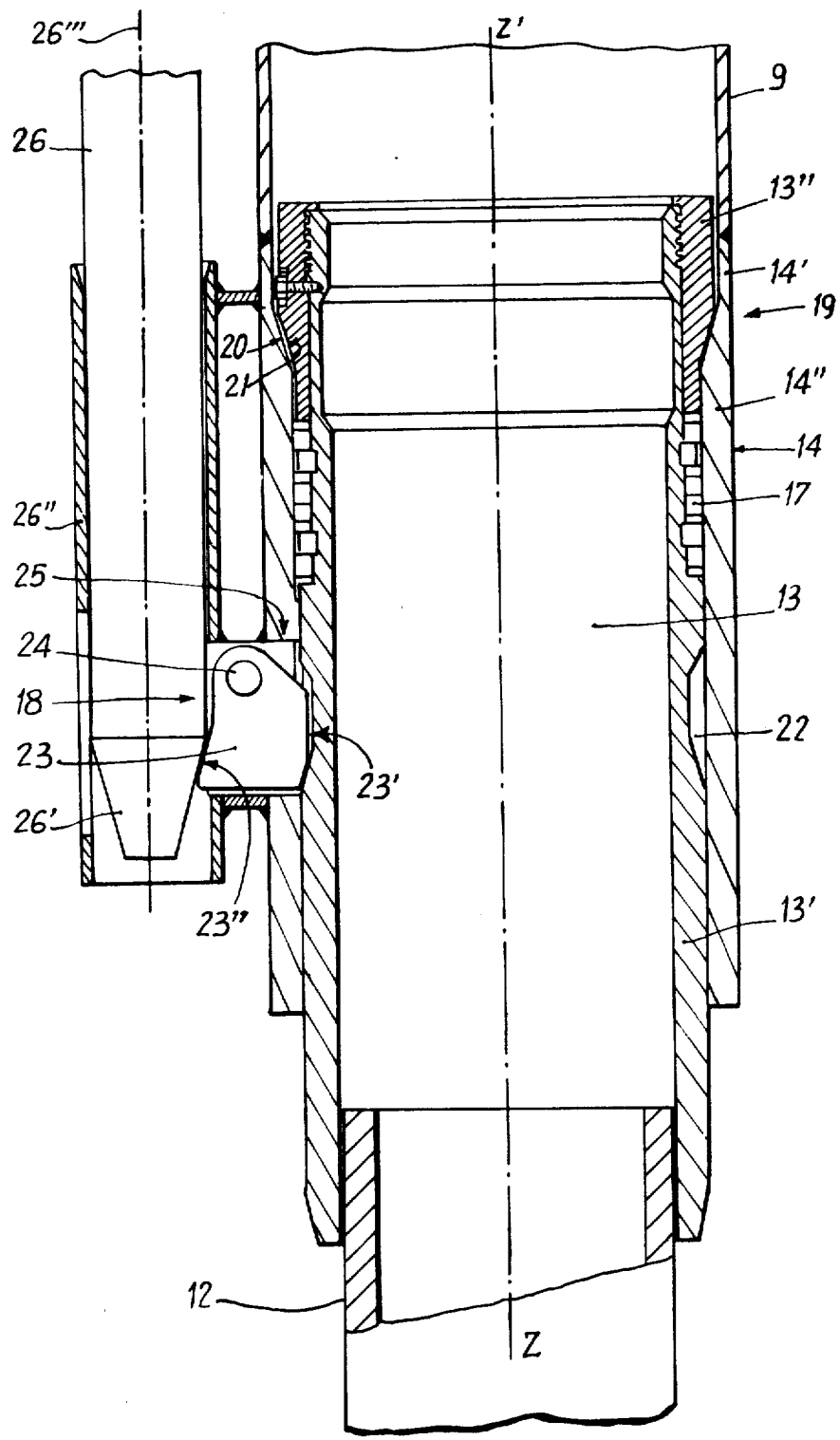
FIG. 2 is a cross-sectional view of an upper adapter with positioning, locking and sealing devices, in its receptacle.

FIG. 2 shows an upper adapter 13, comprising a metal tubular shaft 13', the lower end of which is connected to a flexible pipe 12. This upper adapter contains at least one sealing device 17, of a type known in the existing art, which provides a seal between the adapter 13 and the pipe, and at least one locking device 18. The embodiment shown here also comprises a positioning device 19. When the upper adapter contains all three devices, it is known as a "triple-function adapter". The adapter 13 shown in FIG. 2 is of this type.

In such an adapter, the positioning device 19 comprises an annular surface 20 tapering outwards towards the top, on the outer circumference of the adapter, so shaped that it can rest on a matching tapering annular seating surface on the inside of the receptacle 14.

This tapering annular surface 21 forms part of a collar 13" screwed on to the upper end of the adapter 13, and holding the sealing device 17 in place.

The locking device 18 comprises an annular slot 22 on the outer circumference of the adapter. This co-operates with a locking component 23, consisting of a metal plate, part of which is so shaped that it will penetrate into the slot 22 and rest on it. This plate can rotate freely round an axis, in the form of a pivot 24, the ends of which are fixed to the receptacle 14. This locking component 23 moves through an aperture 25 in the wall of the receptacle 14; the axes of this aperture 25 and slot 22 are at the same distance from the positioning device 19.

The lower end of the locking component 23, facing the inside of the receptacle 14, contains a part 23' which, in the locking position, rests on the surface of the slot 22 in the adapter, and the other side of the component, facing outwards from the receptacle 14, containts a part 23", which, whatever position the locking component is in on its pivot, will come into contact with the tapering lower end 26' of a weight 26 which can move parallel to the axis of the upper receptacle 14.

This weight, which operates the locking device, moves along a cylindrical casing 26", on an axis parallel to the axis of the receptacle 14 and fixed to the outside of it.

The weight is connected by an operating cable 26'" to the surface (not shown here).

The sealing device 17 is located on the other side of the locking device 18 from the flexible pipe 12. In the case of the upper adapter 13, the sealing device 17 is located above the locking device 18.

FIG. 3 shows a lower adapter 15, fitting into a lower receptacle 16, along a plane through the axis ZZ' of this receptacle, which consists of the upper end of the base pipe 10, with a lining 16" inside this pipe end. The receptacle extends upwards in a funnel-shaped tapering mouth 16' which provides a means of centering and positioning the adapter.

The lower adapter 15 contains a positioning device 27, consisting of a tapering annular surface 28 towards the top. This annular surface 28, at the top of the adapter 15, rests on a tapering annular seating surface 29, on the inside of the receptacle, and in this case consisting of part of the mouth 16'.

The adapter 15 also contains a locking device 30, comprising an annular slot 31 on the outside perimeter of the adapter, and at least one locking component 32, consisting of a vertical plate, which can rotate freely round an axis formed by a pivot 33, the ends of which are fixed to the receptacle. This locking component passes freely through an aperture 34 in the wall of the receptacle 16. The slot 31 and aperture 34 are at the same distance from the matching surfaces 28 and 29 of the positioning device 27.

The lower end of the locking component 32, towards the inside of the receptacle 14, contains a part 32', which in the locking position rests on the surface of the slot 31 in the adapter, and the other side of the component, facing outwards from the receptacle 16, contains a part 32", which, whatever position the locking component is in on its pivot, will come into contact with the tapering lower end 35' of a weight 35 which can move parallel to the axis of the upper receptacle 16. This weight, which operates the locking device, moves along a cylindrical casing 36, on an axial parallel to the axis of the receptacle 16 and fixed to the outside of it. The weight is connected by an operating cable 35'" to the surface (not shown here).

The lower adapter 15 contains a sealing device 37 of a type known in the existing art. This provides a seal between the adapter 15 and inside circumference of the lining 16", and is located below the locking device 30.

Finally, the lower adapter 15 can be equipped with a moveable device 40 to close the passage inside it. This is of a type known in the existing art, such as a tapering annular seating surface 41 on the inside circumference of the connecting flange 44, and on which can rest the annular bearing surface 42' of a flap 42. This is operated, and more specifically removed or placed in position, by a cable 43 connected to the surface. This moveable closing device is used in the system illustrated in FIG. 7.

The lower adapter 15 in FIG. 4 contains the same main components as the adapter in FIG. 3. The lower adapter 15 consists of the upper end of the base pipe 10, to which a lining 16" has been fitted. This lining contains a tapering annular seating surface 29, which can fit against a tapering surface 28 on the outer circumference of the adapter. The combination of these two surfaces 28 and 29 provides means to position the adapter inside its receptacle. The inside surface of the lining 16" is machined in order to ensure very close contact with the sealing device 37, of a type known in the existing art, which fits round the outer circumference of the adapter 15.

The lower receptacle 16 extends upwards in a funnel-shaped tapering mouth, which provides a means of centring and positioning the adapter.

The adapter 15 is connected to the flexible pipe 12 by a connector 12' with an outside diameter D.

The adapter also contains a locking device 30, comprising an annular slot 31 in the outer circumference of the adapter. This slot may be straight and symmetrical in section, as in FIG. 3, or asymmetrical as in FIG. 4, where it corresponds to a reduction in the outside diameter of the adapter between a lower section and an upper section, and at least one locking component 38, consisting of a vertical plate, which can rotate freely round an axis formed by a pivot 33, the ends of which are fixed to the receptacle 16 by means of side-plates 33'. This locking component passes freely through an aperture 34 in the wall 16" of the receptacle 16.

The locking components 38 can move on pivots 33 at their lower end, and they are equipped with spring components not shown which allow only slight movement on each side of the locking position.

By means of this arrangement, when the adapter 15 is lowered, a suitable tapering surface 15' at the lower end pushes the locking components 38 apart, and the internal tapering surface at the bottom of the annular weight 39 presses on them during locking.

The upper end of the locking component 38, towards the inside of the receptacle 16, contains a part 38' shaped in such a way that in the locking position it will rest on the surface of the slot 31 in the adapter. For this to be possible, the distance between the surface 28 and the lower edge of the slot 31, and the distance between the seating surface 29 and the part 38' of the locking component which rests on the lower edge of the slot 31, must be equal. The upper end of the locking component 38, facing outwards from the receptacle 16, contains a part 38" which is so shaped that, when the locking component is resting on the slot 31, the inner tapering circumference of the annular weight 39 will rest on part 38.

The inside diameter d of this annular weight is greater than the maximum outside diameter of the adapter 15, but less than the diameter D of the connector 12.

This annular weight 39 can move along parallel to the axis of the receptacle 16, and is connected by three operating cables such as 39' with the surface (not shown here), from where they are operated.

In any such connection-disconnection device, comprising an upper adapter 13, as illustrated in FIG. 2, and which may not contain any positioning device, a flexible pipe 12, and lower adapter 15, as illustrated in FIG. 3 or FIG. 4, and which may not contain any positioning device and/or locking device, the minimum inside cross-sectional area of the upper receptacle 14 is greater than the largest outside circumference of the flexible pipe and adapters, below the positioning device on the upper adapter, where such as a device exists.

LOCKING OF ADAPTERS

Because of the relative dimensions of the components involved, the connection-disconnection device can be lowered from the surface inside the tubing pipe 9, using a tool-laying system (not shown here), which holds the top part of the inside surface of the upper adapter 13. This system is operated by a cable or rods from the surface.

When the upper adapter shown in FIG. 2 and lower adapter shown in FIG. 3 have been positioned, they are locked in the same way, by the use of weights operated from the surface, which move downwards, coming into contact with the parts 23" and 32" on the locking components, and causing them to rotate on their axis, so that the parts 23' and 32' come into contact with the surface of the corresponding slots 22 and 31, and holding them there.

Fitting of the lower adapter shown in FIG. 4 comprises three stages.

When the connection-disconnection device is being lowered, the lower adapter, as it passes through the uppper receptacle and emerges below it, also passes through the opening in the annular weight, which is held by its cables in a position of readiness, immediately beneath the upper receptacle.

As the lower adapter continues to be lowered, the coupling 12' comes into contact with the top of the weight 39, and pulls it downwards to a second position of readiness, in which the surface 28 rests on the seating surface 29 of the positioning device.

Finally, the cables attached to the annular weight are released from the surface, and the weight comes down over the other end of the locking component 38, moving it into the locking position.

UNLOCKING OF ADAPTERS

Whatever combination of upper and lower adapters is chosen, removal of the connection-disconnection device always begins with raising of the locking weights.

When the weights have been raised from each adapter, the adapters can be disconnected simply by pulling on them, and the device raised to the surface.

DESCRIPTION OF OPERATION OF MAIN EMBODIMENTS AND PROCEDURE

Four types of devices are illustrated in FIGS. 5, 6, 7 and 8, and the special operating features of each of them will be described.

FIG. 5 shows a connection-disconnection device comprising a triple-function upper adapter 13, while the lower adapter 15 contains only a sealing device.

The device, attached to a tool-laying system, cable or rods, is lowered through the tubing pipe, with the locking device 18 in the non-locking position.

Means known in the existing art are used to check that the lower end fits properly into the base pipe. When the positioning device 19 is in contact, the locking device 18 is operated from the surface.

During production operations, and if the articulated tubing is subject to considerable displacement, the problem is that the sealing device 37 on the lower adapter has to move. This involves wear and the possibility of leakage.

The connection-disconnection device illustrated in FIG. 6 comprises a triple-function upper adapter and triple-function lower adapter.

In this device, the distance between reference points on the positioning devices of upper and lower adapters is approximately equal to the distance between similar reference points on the corresponding positioning devices on upper and lower receptacles. This means that during installation the upper and lower adapters are placed in position together.

Each adapter is held immobile inside its receptacle, and even if the articulated tubing moves from the vertical, no movement will take place in the sealing devices. The same would be true for a device comprising a triple-function upper adapter and a lower adapter containing a sealing device and a locking device.

Although there is no danger of damage to sealing devices in these embodiments, account has to be taken of the difficulties involved in the fact that the flexible pipe has to operate under compression. This means premature wear on this flexible pipe.

FIG. 7 shows a connection-disconnection device comprising a triple-function upper adapter 13, while the lower adapter contains a sealing device and a locking device. The lower adapter also contains a closing valve 40, as illustrated in FIG. 3.

The lengths of the different parts of the device shown in FIG. 7 are such that when the upper adapter 13 is placed in position and locked, the axis of the slot 31 in the lower adapter 15 is higher than the axis of the aperture 34 in the receptacle.

The device, attached to a tool-laying system, cable or rods, is lowered through the tubing pipe 9. Means known in the existing art are used to check that the lower adapter 15 is inside the receptacle 16.

When the upper adapter 13 has been positioned by the positioning device 19, the locking operation is performed from the surface. The axis of the slot 31 in the lower adapter 15 is still above the axis of the aperture 34.

The valve 40 inside the adapter 15 is shut, and the inside of the pipe 9 is pressurized, if the device has been lowered by cable, or the space inside the line of rods, if the device has been lowered by such means. As the result of this pressurization, the flexible pipe 12 stretches until the axes of the slot 31 and apertures 34 have come level.

Once this position has been reached, the locking weights 35 are released. They push against the locking components, and the lower adapter 15 is locked in position. Pressure is released and the valve 40 opened by withdrawing the flap.

When the connection-disconnection device is installed in this way, the flexible pipe is prestressed in extension, which offers considerable benefits from the point of view of fatigue in the flexible materials, and consequently wear on the whole device.

The connection-disconnection device shown in FIG. 8 comprises an upper adapter 13 which contains a sealing device and a locking device, and a triple-function lower adapter.

The lengths of the different parts of the device shown in FIG. 8 are such that, when the lower adapter 15 is placed in position and locked, the axis of the slot 22 in the upper adapter 13 is lower than the axis of the aperture 25 in the receptacle 14.

The connection-disconnection device, attached to a tool-laying system, cable or rods, is lowered through the pipe 9. Means known in the existing art are used to check that the lower adapter 15 is inside the receptacle 16.

When the lower adapter 15 has been positioned by the positioning device 27, the locking operation is performed from the surface. The axis of the slot 22 in the upper adapter 13 is still below the axis of the aperture 25.

The connection-disconnection device is then pulled upwards either by the cable or by the rod-line, until the flexible pipe 12 is stretched enough for the slot 22 in the upper adapter 13 to come level with the aperture 25.

The locking weights 26 has been released and are pushing against the locking components, so that when the slot 22 and aperture 25 come level the upper adapter 13 is locked into position. Traction on cable or rods is released.

When the connection-disconnection device is installed in this way, the flexible pipe is prestressed in extension, which offers considerable benefits from the point of view of fatigue in the flexible materials, and consequently wear on the whole device.

The connection-disconnection device shown in FIG. 9 comprises an upper adapter 13 containing a sealing device 17 and a positioning device 19, and a lower adapter 15 containing a sealing device 37 and a locking device 30.

The lengths of the different parts of the device shown in FIG. 9 are such that when the upper adapter 13 is placed in position and sealed, the axis of the slot 31 in the lower adapter 15 is higher than the axis of the aperture 34 in the receptacle.

The device, attached to system, cable or rods, is lowered through the pipe 9. Means known in the existing art are used to check that the lower adapter 15 is inside the receptacle 16.

The valve 40 inside the adapter 15 is shut, and the inside of the pipe 9 is pressurized, if the device has been lowered by cable, or the space inside the line of rods, if the device has been lowered by such means. As the result of this pressurization, the flexible pipe 12 stretches until the axes of the slot 31 and the aperture 34 come level.

Once this position has been reached, the locking weights 35 are released. They push against the locking components, and the lower adapter 15 is locked in position. Pressure is released and the valve 40 opened by withdrawing the flap. This is a variant on the procedure described in connection with FIG. 7.

What is claimed is:

1. A connection-disconnection device for use between pipe ends, comprising in combination:
   one pipe end and another pipe end spaced therefrom;
   an adaptor received within each pipe end and extending therebeyond, toward, and in spaced relation to the other adaptor;
   a flexible pipe, adapted to be stretched, interconnecting said adaptors;
   a lock device carried on at least one of said pipe ends, said lock device having a lock element interengageable with a lock recess on the associated one of said adaptors to secure said one adaptor in said one of said pipe ends;
   sealing means between each one of said adaptors and its associated pipe end for sealing engagement therewith;
   and positioning means operable between at least one of said adaptors and its associated pipe end, said positioning means including inclined surface means on said one adaptor in engagement with inclined surface means on its associated pipe end for seating said one adaptor in selected longitudinal relation with respect to its associated pipe end and for longitudinally locating said one adaptor for interengagement of said lock recess with said lock element.

2. A connection and disconnection device as stated in claim 1 including
   means carried by said one of said pipe ends for contact with said lock element for locking and releasing said lock device.

3. A device as stated in claim 2 wherein said locking and releasing means comprises:
   weight means adapted to be lowered and raised externally of said pipe ends for engagement and disengagement with said lock element.

4. A device as stated in claim 1 including
   a second lock device including a lock element on the other of said pipe ends and a lock recess on the associated adaptor;
   and means for imparting a stretched condition to said flexible pipe between said pipe ends after actuation of one of said lock devices.

5. A device as stated in claim 4 wherein said means for imparting a stretched condition to said flexible pipe between said pipe ends includes
   means including a valve on one of said adaptors for closing the through passageway through said flexible pipe and one of said pipe ends.

6. In a connection-disconnection device to join, by a flexible pipe to be stretched, pipe ends, comprising in combination,
   spaced pipe ends, each pipe end providing a receptacle;
   an adaptor comprising an elongate cylindrical body member having a through passageway and an external cylindrical surface,
   an annular transversely disposed groove in said external surface between ends of said body member;
   a locking component carried by said receptacle to secure said adaptor against relative longitudinal movement in said receptacle;
   annular seal means on said external surface of said adaptor spaced from said groove and sealingly engaging the internal surface of said receptacle; and
   an inclined landing surface adjacent one end of said body member engaged by a complementary inclined landing surface on the internal surface of said receptacle for seating said body member in said receptacle in selected longitudinal relation to said annular groove and to said locking component carried by said receptacle,
   a second adaptor;
   a second pipe end providing a receptacle for receiving said second adaptor;

each of said adaptors being received within an associated receptacle at each end of said pipe ends;

locking components provided for each adaptor and on an associated receptacle;

a flexible pipe extending between said adaptors;

the longitudinal spacing of said annular grooves on said adaptors and said locking components exceeding the unstretched length of said flexible pipe and providing predetermined stretching of said flexible pipe between said spaced adaptors after actuation of one of said locking components and before actuation of the other locking component.

7. A device as stated in claim 6 including actuating means for said lock devices including weight means movable externally of said adaptors and receptacles for urging each of said lock components into its associated annular groove.

8. A connection-disconnection device comprising in combination:

a submerged rigid tubing pipe and a submerged rigid tubular base pipe having opposed pipe ends in spaced relation, an upper receptacle on the lower end of the tubing pipe and a lower receptacle on the upper end of the base pipe spaced from the lower end of the tubing pipe;

a flexible pipe extending between said spaced upper and lower receptacles and in communication with said tubing and base pipe;

a first adaptor within said upper receptacle and connected to said flexible pipe;

said first adaptor having a sealing means sealably engaged with said upper receptacle;

a second adaptor connected with the other end of said flexible pipe and received within said lower receptacle;

said second adaptor being provided with a sealing means sealingly engageable with said lower receptacle;

locking devices on said receptacle and each having lock components engageable with lock means on said adaptors for securing said adaptors and receptacles against relative longitudinal movement;

a positioning device including means on at least one of said first and second adaptors and means on the adjacent receptacle to locate and seat the associated adaptor in its receptacle;

the minimum inside cross-sectional area of the upper receptacle being greater than the largest outside circumference of the flexible pipe and second adaptor to permit passage of said flexible pipe and second adaptor through the upper receptacle;

the sealing means of the first adaptor being positioned above the locking device at the first adaptor;

each of said lock means comprising an annular groove on the outside circumference of each adaptor, and actuating means externally of said receptacles for moving said locking components from a non-locking position and through an aperture in the wall of the associated receptacle into a locking position with said annular groove, both groove and aperture being at the same longitudinal distance from the associated positioning device.

9. A device as stated in claim 8 wherein one of said locking devices comprises:

at least one weight element, and a cylindrical casing on an axis parallel to the axis of the associated receptacle and fixed to the external side of the receptacle, the weight element being connected by cable to means at the surface of the water and terminating in a tapering lower end which rests on part of the surface of the associated locking component.

10. A device as stated in claim 8 wherein the locking component comprises:

a vertical plate rotatable freely about a longitudinal axis formed by a pivot pin, the ends of said pivot pin being carried by the associated receptacle;

the lower end of the vertical plate facing towards the inside of the receptacle, and shaped in such a way that it can rest inside the groove on the associated adaptor, while the part of the plate facing outwards is shaped in such a way that in whatever position the vertical plate is about its pivot axis, the tapering lower end of the weight element will rest on at least one part of the vertical plate.

11. A device as defined in claim 8, in which said actuating means to lock the second adaptor in the lower receptacle comprises:

an annular weight connected to at least one operating cable extending to the surface and the inside diameter of a major cylindrical part of the annular weight being greater than the largest outside diameter of the second adaptor and less than the outside diameter of a flange on the second adaptor connecting the flexible pipe to the lower second adaptor, said major cylindrical part extending downwards in a bell-shaped tapering mouth, said annular weight sliding along the second adaptor from an internal position of readiness beneath the upper receptacle, before the connection-disconnection device is lowered, to a second position in readiness in contact with the flange connecting the flexible pipe with the second adaptor, to a final locking position in which the internal tapering mouth rests on outer surfaces of said locking components, the pivots of which are positioned further down at a distance from the axis greater than the inside radius of the annular weight.

* * * * *